US007852218B2

(12) United States Patent
Breslau et al.

(10) Patent No.: US 7,852,218 B2
(45) Date of Patent: Dec. 14, 2010

(54) FINDING AND PACKING TRAVEL ARTICLES

(75) Inventors: Franklin C. Breslau, Teaneck, NJ (US); David B. Kumhyr, Austin, TX (US); Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 12/054,768

(22) Filed: Mar. 25, 2008

(65) Prior Publication Data

US 2009/0243853 A1    Oct. 1, 2009

(51) Int. Cl.
G08B 13/14    (2006.01)
(52) U.S. Cl. .................. 340/572.1; 340/5.92; 705/29
(58) Field of Classification Search ..........................
340/539.11–539.23, 568.1–568.7, 572.1, 340/5.92; 705/28–29
See application file for complete search history.

(56) References Cited

U.S. PATENT DOCUMENTS 7,030,760 B1    4/2006    Brown
2003/0102970 A1*    6/2003    Creel et al. ............... 340/568.1
2006/0087432 A1*    4/2006    Corbett ..................... 340/572.1
2006/0145850 A1*    7/2006    Krstulich .................. 340/572.1
2007/0001839 A1*    1/2007    Cambre et al. ......... 340/539.12
2008/0030345 A1*    2/2008    Austin et al. ............. 340/572.8
2008/0048862 A1*    2/2008    Kritt et al. ................ 340/572.1
2009/0248549 A1*    10/2009    Breslau et al. ................. 705/29

* cited by examiner

*Primary Examiner*—Brent Swarthout
(74) *Attorney, Agent, or Firm*—Dillon & Yudell LLP

(57) ABSTRACT

A system and method for locating one or more travel articles for packing, out of a plurality of travel articles. A transponder having a unique locator tag is disposed on each travel article that can be potentially selected for packing. A user or computer selects one or more travel articles for packing using an article tracking unit. Article tracking unit communicates a ping signal to a transponder that is associated with a selected travel article for packing. Upon receipt of the ping signal, a transponder controller activates an indicator, such as an aural or visual cue. The activated indicator assists a user in locating the travel article that is associated with the activated indicator. Once the selected travel article for packing is located and packed in a travel container, the indicator is deactivated.

14 Claims, 6 Drawing Sheets

FINDING AND PACKING TRAVEL ARTICLES

CROSS-REFERENCE TO RELATED APPLICATIONS

The present application is related to the following commonly assigned patent applications: U.S. patent application Ser. No. 12/054,786, entitled "MAINTAINING A RUNNING LIST OF PACKED TRAVEL ARTICLES" by Franklin C. Breslau, et al., which was filed on even data herewith and is incorporated herein by reference in its entirety for all purposes.

BACKGROUND

1. Technical Field

The present invention generally relates to Radio Frequency IDentification (RFID) devices and in particular to a system and method for finding and packing travel articles using RFID technology.

2. Description of the Related Art

When packing for a trip, travelers often make mistakes under the stress of time. A common mistake that travelers make is over-packing their luggage with unnecessary travel articles. Unnecessary articles can be travel articles that have been packed in duplicate or articles that are simply not needed on the trip. Conversely, another common mistake is when travelers forget to pack essential articles, such as a passport, a coat or prescription medication. In addition, some travel articles may be difficult to locate, especially when the traveler is under time pressure.

Moreover, assuming that the traveler is successful in locating and packing all the necessary travel articles, the possibility exists that a transportation carrier (i.e., rail line, bus line, airline, cruise line) will lose the traveler's packed luggage piece in transit. Typically, such an unfortunate event occurs when there are one or more connections that traveler (and luggage) must make before arriving at the final destination. The traveler must then endure the inconvenience of having to fill out a lengthy claim form from memory that thoroughly details the contents of the lost piece of luggage. Such detail can include the brand, model, general description, and estimated cost of the lost contents. In addition, the traveler may find himself or herself having to quickly try to replace the lost travel articles in order to effectively continue the trip.

SUMMARY OF ILLUSTRATIVE EMBODIMENTS

Disclosed are a system and method for locating at least one travel article out of a plurality of travel articles. Prior to packing for a trip, a transponder having a unique locator tag is disposed on each travel article of the plurality of travel articles. A user selects from a packing wizard at least one travel article for packing. A ping signal is communicated to each transponder that is associated with the selected travel article for packing. Upon receiving the ping signal, each transponder respectively activates an indicator, which assists a user in locating the travel article to be packed. Once the user has located the travel article to be packed and has packed the selected travel article, the indicator associated with the selected, packed travel article is deactivated.

In addition, a system and method of maintaining a running list of a plurality of packed travel articles are disclosed. One or more travel articles having the unique locator tag, is/are packed in one or more travel containers. A current packing distribution list of the one or more travel articles is generated by utilizing the unique locator tag, and stored. The current packing distribution list utilizes (a) the unique locator tag associated with each travel article that is packed, and (b) an identification of the travel container in which each travel article is packed. The storing of the current packing distribution list is such that if one or more travel articles are added to or removed from one or more travel containers, then the one or more travel articles are added to or removed from the current packing distribution list, respectively. A determination is made whether the current packing distribution list is optimizable. If the determination is made that the current packing distribution list is optimizable, an optimized packing distribution list is generated and displayed as the new current packing distribution list. The user may then re-pack the travel articles based on the optimized distribution list. In this regard, any change to the current packing distribution list is tracked. The change(s) to the current packing distribution list result(s) from the re-distribution of the one or more travel articles among the one or more travel containers to reflect the optimized distribution list. Moreover, even if the current packing distribution list is not optimizable, the current packing distribution list is stored and/or displayed as the current packing distribution list.

The above, as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
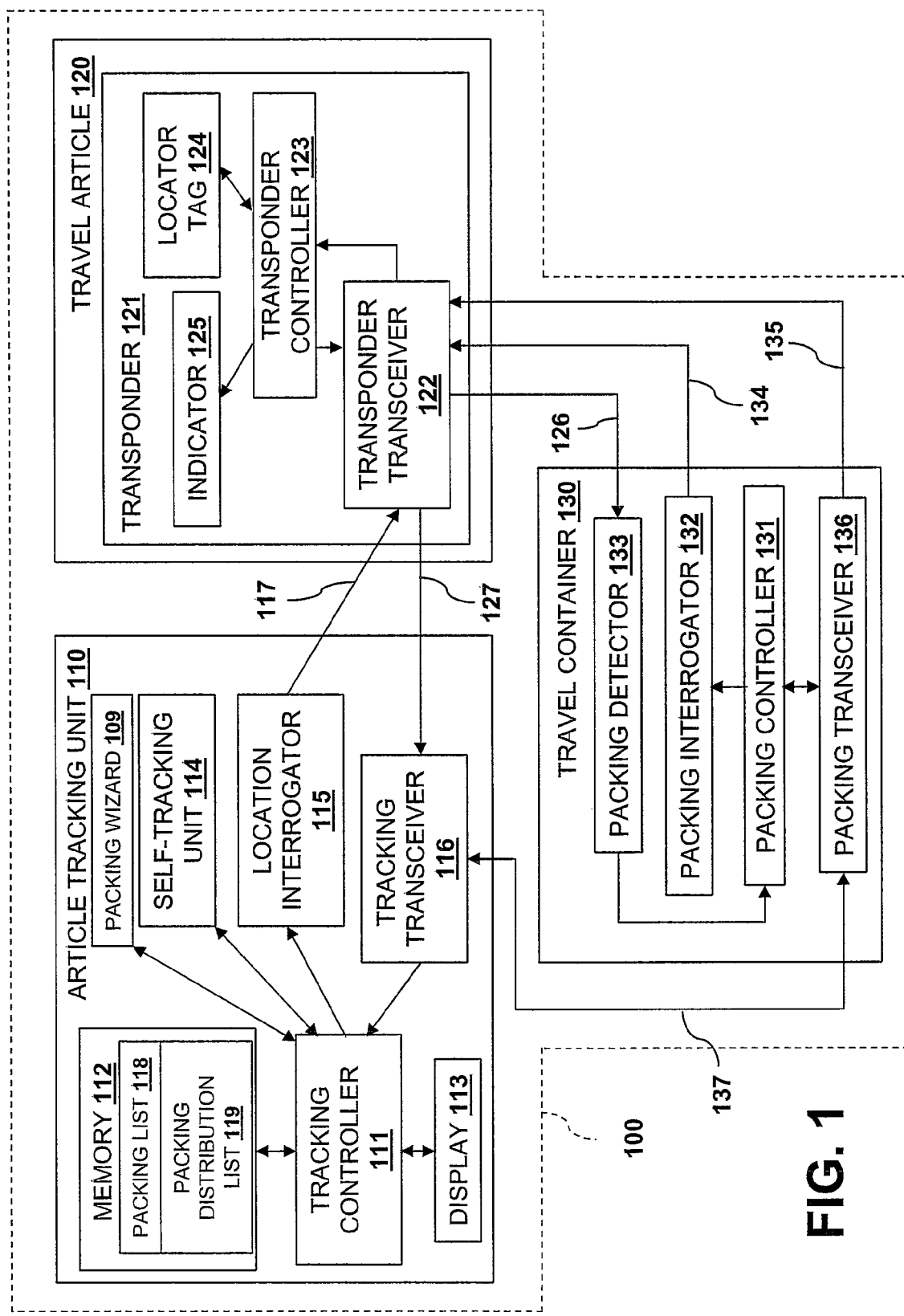
FIG. 1 is a block diagram of an exemplary travel article locating and dynamic inventorying system according to one or more embodiments of the invention.

The illustrative embodiments provide a system and method for finding and packing at least one travel article.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present invention. The following detailed description is, therefore, not to be taken in a limiting sense, and the scope of the present invention is defined only by the appended claims.

Within the descriptions of the figures similar elements are provided similar names and reference numerals as those of the previous figure(s), except that suffixes may be added, when appropriate, to differentiate such elements. The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to the figures, FIG. 1 depicts a block diagram of an exemplary Travel Article Locating and Dynamic Inventorying (TALDI) system 100 according to one or more embodiments of the invention. TALDI system 100 includes an article tracking unit 110, one or more travel articles 120, and one or more travel containers 130. Article tracking unit 110 assists in finding one or more travel articles 120 for packing, such that travel articles 120 are later packed in one or more travel containers 130.

Article tracking unit 110 generally includes tracking controller 111, which coordinates the functions associated with memory 112, display 113, self-tracking unit 114, location interrogator 115, and tracking transceiver 116. Tracking controller 111 may, for example, be a microprocessor, an application-specific IC (ASIC), a field-programmable array (FPA), or a memory array, among other types of IC devices. More generally, instructions for implementing tracking controller 111 may be in the form of any combination of software or hardware, including hardware within an IC device. Article tracking unit 110 can be located within a stand-alone (i.e., separate) unit, or alternatively incorporated within a personal digital assistant (PDA) or a cellular phone. However, it should be understood that article tracking unit 110 may be located within other ubiquitous personal communications devices such as laptop computers. If article tracking unit 110 is implemented using a computer, article tracking unit 110 may be implemented as a Universal Serial Bus (USB) plug-in module, Personal Computer Memory Card International Association (PCMCIA) card, or other commonly deployed plug-in module. The invention can also be implemented as software and use a computer's wireless module.

Memory 112 may include, but is not limited to, cache memory, random access memory (RAM), read only memory (ROM), firmware memory devices, registers, and buffers, among other storage elements. Memory 112 stores data corresponding to packing list 118 of travel articles that are identified by unique locator tag 124, such as a Radio Frequency IDentification (RFID) tag. Tracking controller 111 presents a menu to the user through display 113. The menu allows the user to manage packing list 118 stored in memory 112. The data in packing list 118 is inputted by the user and contains records corresponding to each travel article that is to be packed, or at least has the potential to be packed in travel container(s) 130. Each record includes an RFID and a name of the travel article. Moreover, in another embodiment, each record can contain additional information such as geographic or cultural data associated with a particular travel article. Such additional information assists a user in packing geographically, culturally, and/or checkpoint-security-suitable travel articles, when relevant travel information is inputted via packing wizard 109 to tracking controller 111. Suitable input devices that can be used to input such relevant travel information include, but are not limited to, a keypad/keyboard (not shown) and/or a touch screen (not shown) that is incorporated with display 113.

According to another embodiment of the invention, memory 112 stores packing distribution list 119. Packing distribution list 119 identifies the travel article(s) that is/are: (i) currently packed and/or (ii) optimally packed, in one or more travel containers 130. In this regard, tracking controller 111 determines whether a current packing distribution list can be optimized. Thus, an optimized packing distribution list is generated by tracking controller 111 and outputted to a user, using display 113. It should be appreciated that the term "optimized packing distribution list" refers to a packing distribution list that has undergone optimization. Once a user has actually redistributed/rearranged the travel articles based on the suggested optimized packing distribution list, the optimized packing distribution list becomes the new, current packing distribution list.

Self-tracking unit 114 is any device, such as a Global Positioning System (GPS) receiver, that is capable of determining the location of article tracking unit 110 within which TALDI system 100 is implemented in. The positioning data acquired using self-tracking unit 114 is graphically communicated to a user via display 113. Display 113 displays a locator map/blueprint (not shown) to assist a user in locating said at least one selected travel article for packing by showing the location of article tracking unit 110 relative to the locator map. The locator map allows the user to become more oriented in a space that may be unfamiliar to a user. Location interrogator 115 is responsive to tracking controller 111 and communicates ping signal 117 to transponder 121, which is disposed on travel article 120. According to another embodiment, transponder 121 communicates GPS data relating to the location of the travel article to be packed. The location of the travel article to be packed is shown on locator map relative to article tracking unit 110.

Transponder 121 generally includes transponder transceiver 122, transponder controller 123, locator tag 124, and indicator 125. Transponder transceiver 122 receives ping signal 117 and communicates with transponder controller 123. Location interrogator communicates ping signal 117 in an attempt by article tracking unit 110 to: (i) trigger the activation of indicator 125 and/or (ii) acquire RFID information contained in locator tag 124. In one embodiment, ping signal 117 is transponder-specific, which means that ping signal 117 targets only those transponders 121 which are associated with travel articles that are selected for packing in travel container 130. Transponder controller 121 is responsible for analyzing ping signal 117 and for determining whether ping signal 117 is intended for transponder 121. If ping signal 117 is not intended for transponder 121, transponder controller 123 will do nothing. However, if ping signal is intended for transponder 121, transponder controller 123 activates indicator 125. Indicator 125 may be an aural cue (e.g., beeping or vibrating sound), a visual cue (e.g., flashing Light Emitting Diodes (LEDs)), or any type of sensory cue which assists the user in locating the travel article for packing. Additional functions of transponder controller 123 are discussed below when travel article 120 is packed in travel container 130.

In other embodiments, transponder 121 may be a passive device that contains no internal power supply. The electrical current induced in the antenna of transponder transceiver 122 by the incoming ping signal 117 provides enough power for the IC in transponder 121 to power up and transmit a response (such as the trigger and acquiring steps described in (i) and (ii), respectively, in the previous paragraph). In another embodiment, article tracking unit 110 searches for back signal 127 from travel article 120, which is tagged with locator tag 124. Back signal 127 can be used to display a location on a locator map on display 113.

Travel container 130 can be any type of object that is suitable for transporting articles for travel. Examples of travel containers include, but are not limited to, luggage, briefcases, or computer carrying cases. In the current embodiment shown in FIG. 1, travel container 130 includes various circuitries for detecting whether selected travel article 120 has been packed within travel container 130. Such circuitries include packing controller 131, packing interrogator 132, and packing detector 133. Packing interrogator 132 communicates packing location signal 134, which is received by transponder transceiver 122 and processed by transponder controller 123. If transponder 121 is within signal range of packing location signal 134, transponder controller 123 directs (i) the generation of return signal 126, which is transmitted via transponder transceiver 122 and/or (ii) the deactivation of indicator 125. The deactivation of indicator 125 indicates that the travel article has been packed within travel container 130. It should be appreciated that in order for transponder 121 to be detected within signal range of packing location signal 134, the signal range of packing location signal 134 is such that only transponders 121 that have been packed within travel container 130 are detected.

According to one embodiment of the invention, return signal 126 contains the RFID information (i.e., from locator tag 124) associated with the packed travel article. The data in return signal 126 is used to verify whether the "correct" travel article 120 (i.e., travel article that has been selected) is packed. The verification process by packing controller 131 compares the RFID information contained in return signal 126 with the list of RFIDs from packing list 118 selected by user, which requires packing controller 131 to gain access to memory 112. Access between memory 112 and packing controller 131 can be acquired through a wired or wireless interface via tracking transceiver 116 and packing transceiver 136. In an alternate embodiment, tracking controller 111 of article tracking unit 110 receives the RFID information and performs the verification process steps (i.e., comparing and computation steps).

According to another embodiment of the invention, packing controller 131 communicates to tracking controller 111 which travel article has been packed in a particular travel container 130. In this regard, it should be appreciated that more than one travel container 130 may be packed with travel articles 120. Thus, there can be more than one packing controller 131 that is in communication with tracking controller 111 (via respective tracking transceiver 116). Packing controller 131 communicates a current list/description of travel articles that are packed within a respective travel container 130. Tracking controller 111 stores the current list/description of travel articles that are packed within a respective travel container 130 as a current packing distribution list 119 in memory 112.

Tracking controller 111 determines whether further optimization (i.e., redistribution or rearrangement of travel articles 120 within/between travel containers 130) of the current packing distribution list is possible. If the current packing distribution list is optimizable, an optimized packing distribution list is generated by tracking controller 111 and displayed for a user. The user employs the displayed optimized packing distribution list in rearranging the current distribution of travel articles throughout the plurality of travel containers 130. The circuitry in travel container 130 communicates to tracking controller 111 whether an addition or removal of travel articles 120 has occurred, such that any changes to current packing distribution list 119 are updated and stored in memory 112. It should be appreciated that such communication (indicated by bi-directional arrow 137) depends on whether packing transceiver 136 and tracking transceiver 116 are within signal range of each other. According to another embodiment, it should also be recognized that an optimized packing distribution list can be generated from the outset when a user utilizes packing wizard 109 to select travel articles 120 to pack within a plurality of travel containers 130. Further description of an exemplary packing wizard 109 is provided below in FIG. 4.

Figure 4:
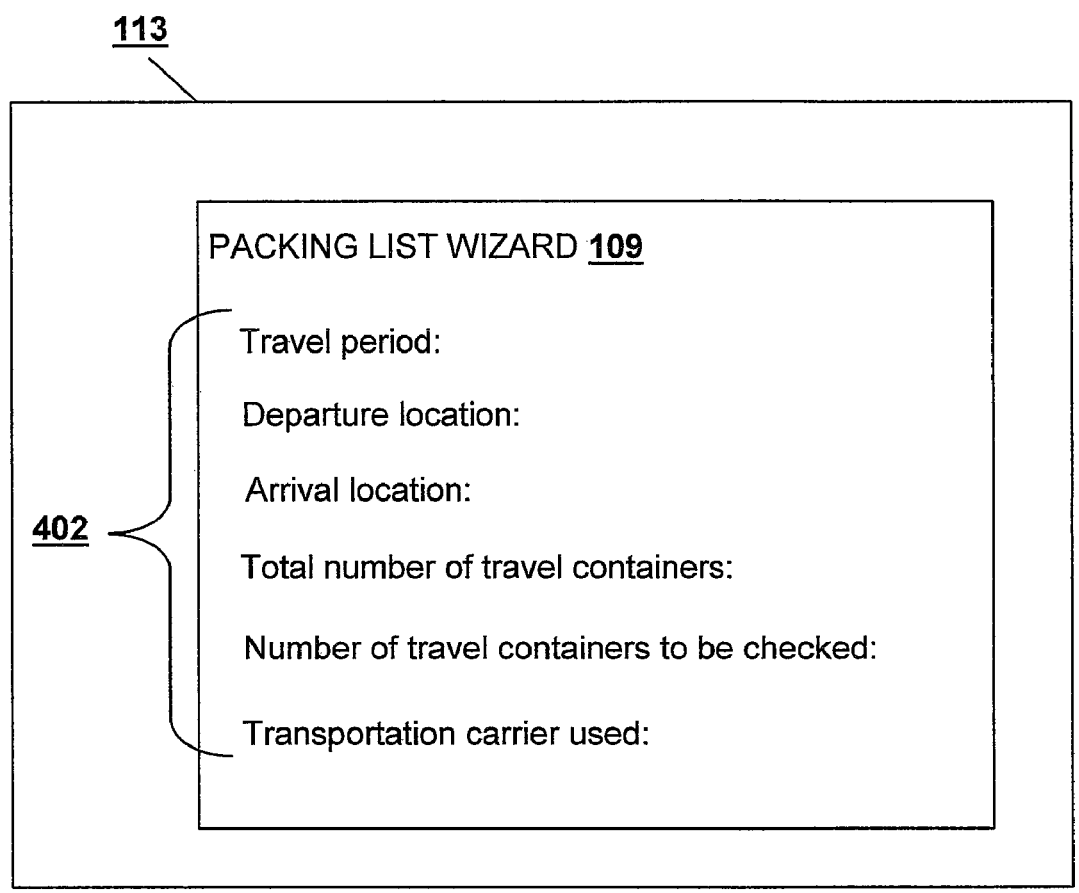
FIG. 4 illustrates a packing wizard according to one or more embodiments of the invention.

Referring now to FIG. 4, an exemplary packing wizard 109 is illustrated. Packing wizard 109 presents to a user via display 113 a series of query fields 402 which a user inputs the relevant travel information. Based on the particular travel information that is inputted, packing wizard 109 communicates with tracking controller 111, which generates a suggested: packing list 118 for finding the suggested travel articles 120 to be packed. In another embodiment, packing wizard 109 generates an optimized packing distribution list 119 that suggests a particular distribution/arrangement of travel articles 120 within a plurality of travel containers 130. It should be appreciated that not all travel articles 120 that are suggested by packing wizard 109 are required to be packed by the user. Conversely, other travel articles 120 that are not suggested by packing wizard 109 may be packed by a user. For these cases in which a user departs from a suggested packing list 118 or a suggested optimized packing distribution list 119, packing wizard 109 provides a manual user override feature.

Those of ordinary skill in the art will appreciate that hardware and software configurations depicted in FIGS. 1 and 4 may vary. For example, other hardware or software components may be used in addition to or in place of the depicted components. Article tracking unit 110, transponder 121, and the internal circuitry in travel container 130 may, for example, be a portion of a larger IC device or a system-on-chip (SoC), system-in-package (SiP), and system-in-module (SiM) device, as well as may incorporate some of such devices or elements thereof. Therefore, the architecture depicted in FIG. 1 is a basic illustration of an IC device, for which actual implementations may vary. For example, in another implementation, locator tag 124 can utilize chipless RFID technology that allows for discrete identification of tags without an IC. Chipless RFID technology allows locator tag 124 to be printed directly onto travel article 120 at a lower cost. Thus, the depicted examples in FIGS. 1 and 4 are not meant to imply architectural limitations with respect to the present invention.

Figure 2A:
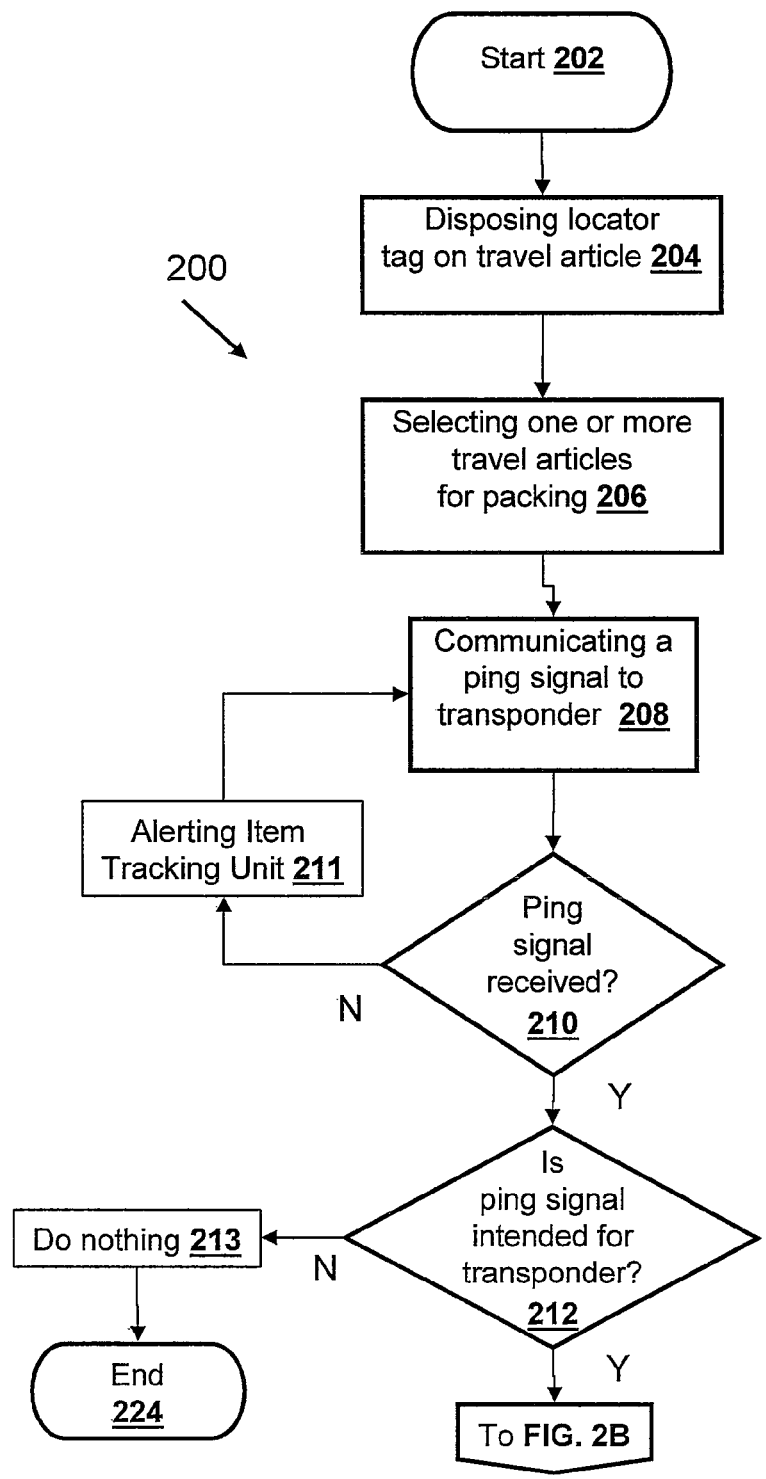
FIGS. 2A-2B together form a high level logical flowchart of an exemplary method of locating one or more travel articles for packing, according to one embodiment of the invention.
Figure 2B:
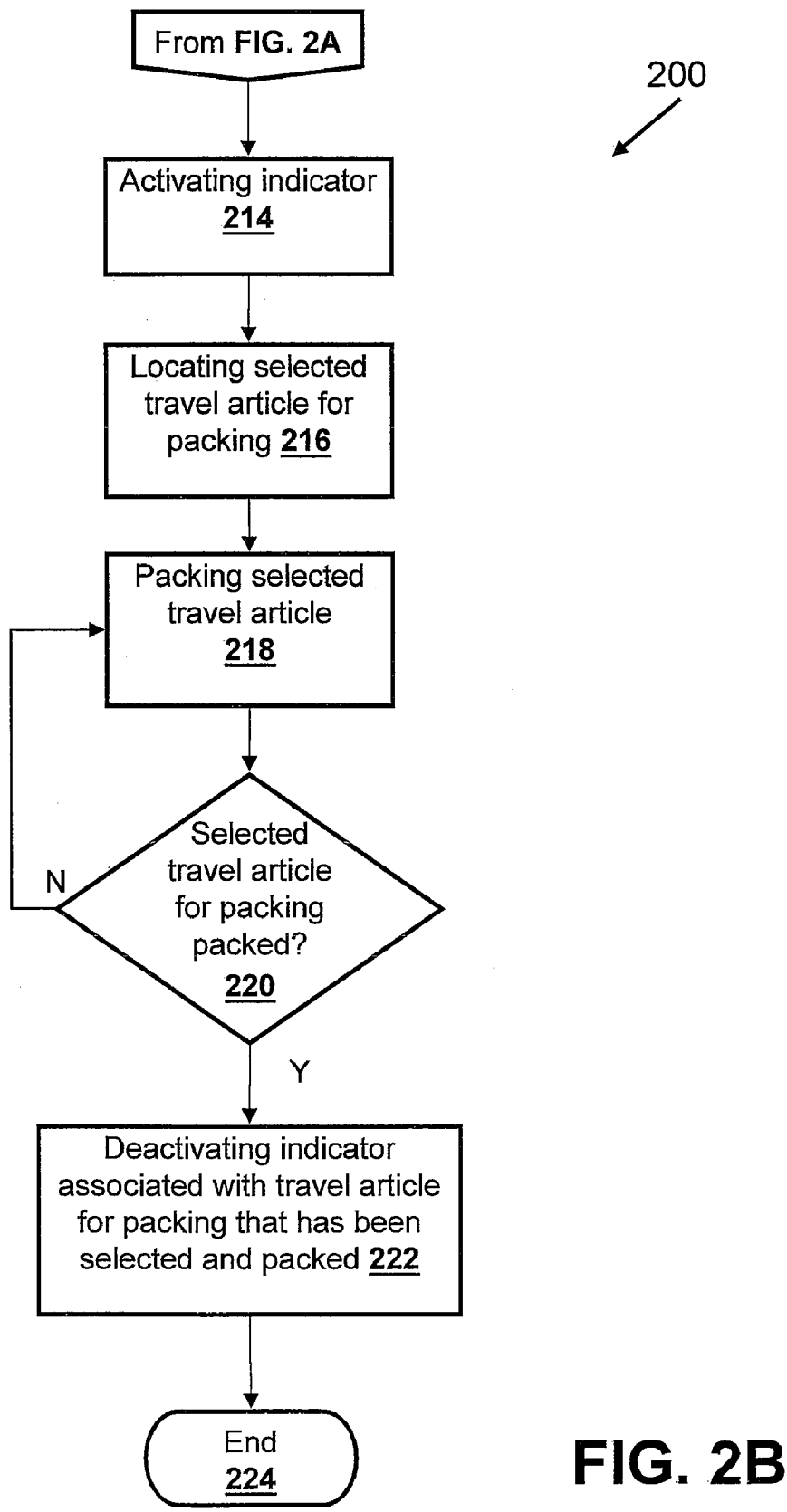

Referring now to FIGS. 2A and 2B, there are illustrated portions of flow chart 200, which illustrates the exemplary method steps used to implement and utilize the method of locating one or more travel articles for packing. Portions of the method may be completed by software that is executed by processor hardware (not shown) within tracking controller 111, transponder controller 123, and packing controller 131. To best understand the invention, the reader should refer to FIGS. 1, 2A, 2B, and 4 simultaneously.

In FIG. 2A, the method begins at block 202, and continues to block 204. At block 204, transponder 121 is attached, embedded, affixed or, in some way, disposed to each one of a plurality of travel articles 120. It should be appreciated that there can be more travel articles on which transponders 121 are disposed than will be eventually selected for packing. At block 206, a user selects one or more travel articles for packing (in one or more travel containers 130). In one embodiment, potential travel articles (i.e., travel articles that may/may not be packed) are first inputted in article tracking unit 110 using an input device, such as a touch-screen display (i.e., display 113). Once the potential travel articles are inputted and stored in memory 112 as packing list 118, the user can select which travel articles from packing list 118 to locate for actual packing. Alternatively, the user can utilize packing list wizard 109 to automatically generate packing list suggestions, which are based on the user's inputted travel information.

At block 208, tracking controller 111 directs location interrogator 115 to generate ping signal 117. At decision block 210, a determination is made whether ping signal 117 is received by transponder transceiver 122. If ping signal 117 is not received (or a timeout occurs), article tracking unit 110 is alerted, as depicted in block 211, and the method returns to block 208 in a recursive loop. However, if ping signal 117 is received by transponder transceiver 122, ping signal 117 is analyzed by transponder controller 123 to determine whether ping signal 117 is intended for transponder 121, as depicted in decision block 212. If ping signal 117 is not intended for transponder 121, no further actions are performed, as depicted in block 213. However, if transponder controller 123 determines that ping signal 117 is intended for transponder 121, the method continues to block 214 of FIG. 2B. In block 214, transponder controller 123 activates indicator 125 to assist a user in finding/locating travel article 120.

At block 216, the travel article 120 that is selected for packing is located by the user. In one embodiment, the user utilizes indicator 125 to locate the travel article 120 that has been selected for packing. After the user has located travel article 120 that is selected, the method proceeds to block 218, in which the selected travel article 120 is packed in travel container 130. At decision block 220, a determination is made whether the selected travel article 120 has been packed. To determine whether a travel article 120 has been packed, packing interrogator 132 communicates packing location signal 134, which is received by transponder transceiver 122 and processed by transponder controller 123. If transponder 121 is within signal range of packing location signal 134, transponder controller 123 directs the generation of return signal 126, which is transmitted via transponder transceiver 122. If the selected travel article 120 is not packed, the method returns to block 218 in a recursive loop. Otherwise, the method continues to block 222. At block 222, indicator 125 is deactivated by transponder controller 123. The method ends at termination block 224.

According to another embodiment of the invention, the method further includes the step of communicating an alert signal when an incorrect travel article is packed in travel container 130. An incorrect travel article is a travel article that has a unique locator tag 124, but is not selected by the user for packing. Since return signal 126 contains the RFID information (i.e., from locator tag 124) associated with the packed travel article, tracking controller 131 is able to verify whether the correct travel article 120 (i.e., travel article that has been selected) is packed. This verification process by packing controller 131 compares the RFID information contained in return signal 126 with the list of RFIDs from packing list 118 selected by the user, which requires packing controller 131 to gain access to memory 112. In this regard, access to memory 112 is achieved through wireless communication using tracking transceiver 116 and packing transceiver 136. If the RFID information contained in return signal 126 does not match any one of the list of RFIDs from packing list 118 that are selected by the user, packing controller 131 communicates alert signal 135 to transponder controller 123 via packing transceiver 136 and transponder transceiver 122. Alert signal 135 prompts transponder controller 123 to activate indicator 125. According to another embodiment, once an incorrect travel article has been detected, a notification is sent to article tracking unit 110. The notification that is sent to article tracking unit 110 is interpreted by packing wizard 109, which notifies a user via display 113 whether the user wishes to perform a manual override of the incorrect travel article.

Figure 3A:
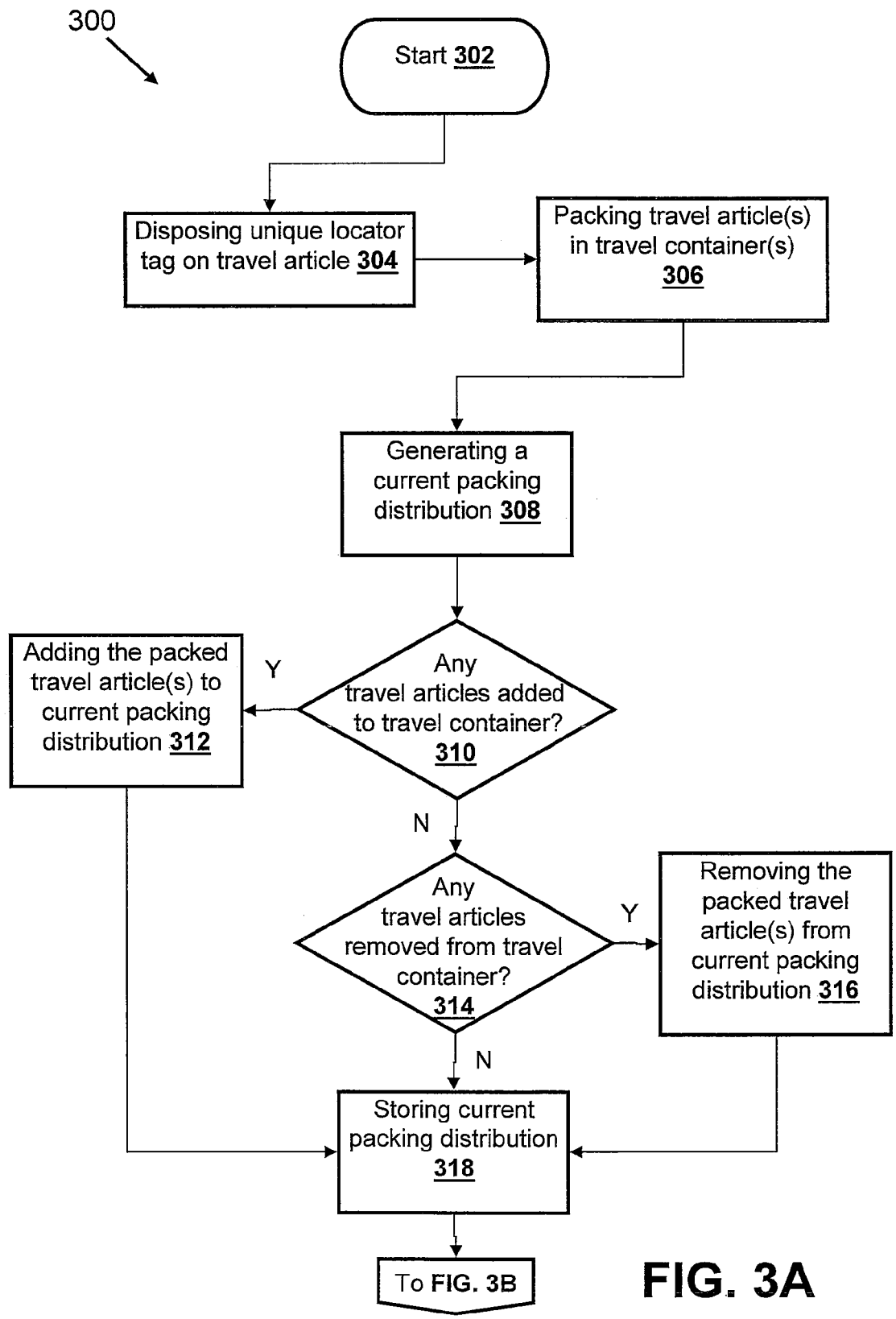
FIGS. 3A-3B together form a high level logical flowchart of an exemplary method of maintaining a running list of packed travel articles, according to another embodiment of the invention.
Figure 3B:
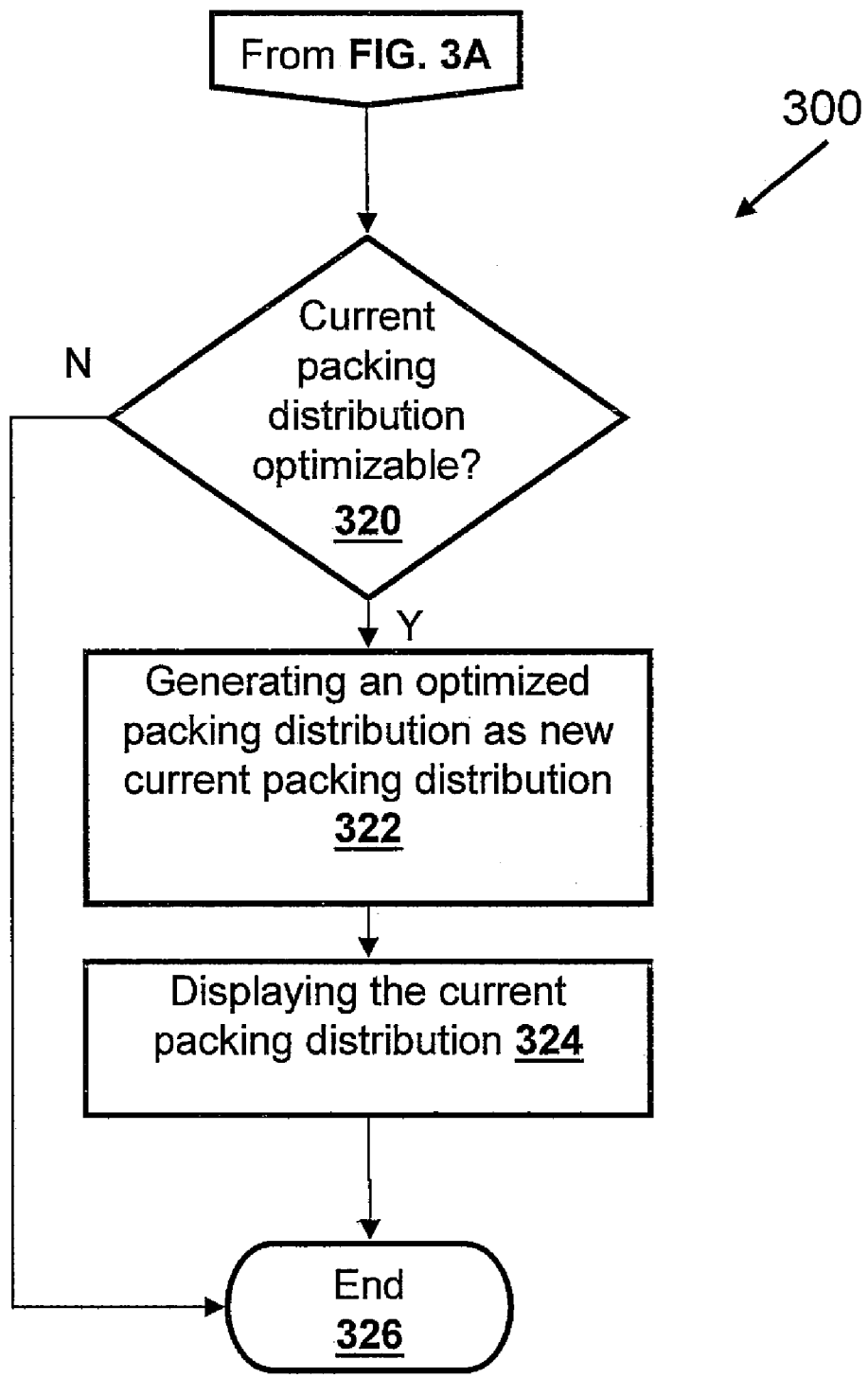

Referring now to FIGS. 3A and 3B, there are illustrated portions of flow chart 300, which illustrates the exemplary method steps used to implement and utilize the method of maintaining a running list of packed travel articles. Portions of the method may be completed by software that is executed by processor hardware (not shown) within tracking controller 111, transponder controller 123, and packing controller 131. To best understand the invention, the reader should refer to FIGS. 1, 3A, 3B, and 4 simultaneously.

In FIG. 3A, the method begins at block 302, and continues to block 304. At block 304, transponder 121 is disposed to each one of a plurality of travel articles 120. At block 306, one or more travel articles 120, which has/have been tagged with locator tag 124 are packed in one or more travel containers 130. If transponder 121 is within signal range of packing location signal 134, indicating travel article 120 has been packed in travel container 130, transponder controller 123 directs the generation of return signal 126, which is transmitted via transponder transceiver 122 and received by packing detector 133. Return signal 126 contains the RFID information (i.e., from locator tag 124) associated with packed travel article 120. Packing controller 131 receives the RFID information from one or more travel articles 120. The RFID information may include, but is not limited to, a unique identifier (e.g., number or code or name) and may also include a travel article's brand, model, general description, and estimated cost. Upon receipt of the RFID information, packing controller 131 directs signal 137 to article tracking unit 110, where signal 137 is received by tracking transceiver 116. Signal 137 includes: (i) the RFID information that is communicated in return signal 126 and (ii) the unique identification of the travel container associated with the packed travel article (since there can be more than one travel container 130 that is packed with tagged travel articles).

Article tracking unit 110 collects a unique signal 137 from each travel container 130 that is packed with tagged travel articles 120. The combined data that is received from all travel containers 130 make up a current packing distribution list 119. In block 308, tracking controller 111 generates current packing distribution list 119. Moreover, tracking controller 111 determines at decision block 310 whether the current packing distribution list should be updated depending upon any subsequent receipt of signal(s) 137. If tracking controller 111 determines that a particular travel article 120 is added to a particular travel container 130 for packing (decision block 310), the particular travel article 120 is added to the current packing distribution list (block 312). From block 312, the current packing distribution list 119 is stored in memory 112, as depicted in block 318. If it is determined that no travel articles 120 have been added to travel container 130, the method continues to decision block 314, where tracking controller 111 determines whether a particular travel article 120 is removed from the current packing distribution list. If it is determined that a particular travel article 120 has been removed from a particular travel container 314, the particular travel article 120 is removed from the current packing distribution list (block 316). As a result, the updated packing distribution list maintains a running list of all travel items that are packed in a particular travel container. From block 316, the current packing distribution list 119 is stored in memory 112 and the method continues to decision block 320 of FIG. 3B.

In decision block 320, a determination is made by tracking controller 111 whether current packing distribution list is optimizable. As used herein, the term "optimizable", means that the current packing distribution list is such that further redistribution or re-arrangement of travel articles would be suggested in order to more optimally distribute travel items based on considerations, such as weight distribution, reducing the effect of a travel container getting lost in transit, and so on. For example, assume that there are two travelers of the same traveling party and each traveler has packed his/her luggage piece with his/her own travel articles. If the luggage piece of one of the two travelers is lost, then the unfortunate traveler would be left with none of his/her travel articles. In contrast, the other traveler of the same traveling party will have all of his/her travel article. Thus, it would be more optimal to have packed each luggage piece with an equal distribution of travel articles belonging to the two travelers. Similarly, optimization of the current packing distribution list is also warranted when one of the two luggage pieces contains all travel articles of a particular type. In view of the above examples, it should be appreciated that the invention is not limited to a particular number of travel containers.

If it is determined that the current packing distribution list is not optimizable, the method ends at termination block 326. However, if it is determined that the current packing distribution list is optimizable, tracking controller 111 generates an optimized packing distribution list, as depicted in block 322. The optimized packing distribution list is then displayed to a user via display 113 (at block 324) and the method ends at termination block 326.

While RFID technology is used in the illustrated embodiment shown in FIG. 1 and described above, it should be appreciated that other technologies (e.g., optical recognition) may be used to extract the same or similar travel article information as contained in locator tag 124. For example, each travel article 120 may contain a bar code (or other similar optical-readable tag) that can be scanned by an optical scanning unit (not shown) that is integrated with either article tracking unit 110 and/or travel container 130. As a travel article is packed in travel container 130, a user may scan the bar code associated with the packed travel container 130.

In the flow charts in FIGS. 2A-3B, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be saved in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional IC device with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non-exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for locating at least one travel article for packing, out of a plurality of travel articles, the system comprising:
    a transponder having a transponder transceiver, a unique locator tag, and an indicator for signaling a physical location of said travel article for packing;
    wherein said unique tag includes one or more of geographic data and cultural data associated with said at least one travel article for packing;
    wherein prior to packing said travel article, said transponder is disposed on each travel article of said plurality of travel articles;
    a packing wizard for selecting at least one travel article for packing;
    wherein said packing wizard utilizes one or more of geographic data and cultural data to generate a suggested packing list;
    a memory for storing a packing list of at least one selected travel article for packing;
    a location interrogator for communicating a ping signal to said transponder transceiver of said transponder of said at least one selected travel article for packing;
    wherein, in response to receiving said ping signal, said indicator of said transponder of said at least one selected travel article for packing is activated to provide an indication of the location of said at least one selected travel article, wherein said indication includes identification of said at least one selected travel article on a location map which assists in user orientation within a particular space; and a travel container for packing said at least one selected travel article for packing;

wherein said indicator of said transponder of said at least one selected travel article is deactivated when said at least one selected travel article is packed in said travel container.

2. The system of claim 1, wherein said indicator is at least one of an aural cue or a visual cue.

3. The system of claim 1, further comprising:

a display for displaying a locator map for locating said at least one selected travel article for packing of said plurality of travel articles;

wherein said locator map identifies location of said at least one selected travel article on the locator map relative to the article tracking device.

4. The system of claim 1, wherein said indicator is deactivated when said at least one selected travel article is packed in said travel container.

5. The system of claim 1, wherein said unique locator tag includes at least one geographic or cultural data associated with a particular travel article.

6. The system of claim 1, wherein said unique locator tag utilizes chipless RFID technology.

7. The system of claim 1, wherein said packing wizard automatically generates a suggested packing list that is based on a user's inputted travel information, wherein said travel information associates travel with a particular travel article; wherein said travel information includes one or more of geographic data, cultural data and other travel-related information.

8. A method of locating at least one travel article for packing of a plurality of travel articles, the method comprising:

disposing a transponder having a unique locator tag on each travel article of said plurality of travel articles;

wherein said unique tag includes one or more of geographic data and cultural data associated with said at least one travel article for packing;

selecting from a packing wizard said at least one travel article for packing of said plurality of travel articles;

wherein said packing wizard utilizes one or more of geographic data and cultural data to generate a suggested packing list;

communicating a ping signal to said transponder associated with said at least one selected travel article for packing of said plurality of travel articles;

receiving said ping signal, wherein said ping signal is received by said transponder associated with said at least one selected travel article for packing of said plurality of travel articles;

in response to receiving said ping signal, activating an indicator associated with said at least one selected travel article for packing of said plurality of travel articles;

locating said at least one selected travel article for packing of said plurality of travel articles, by utilizing said indicator;

wherein said indicator provides identification of said at least one selected travel article on a location map which assists in user orientation within a particular space;

packing said at least one selected travel article for packing of said plurality of travel articles in a travel container; and in response to packing said at least one selected travel article for packing of said plurality of travel articles in said travel container, deactivating said indicator associated with said at least one packed, selected travel article for packing of said plurality of travel articles.

9. The method of claim 8, wherein said indicator provides at least one of an aural cue or a visual cue.

10. The method of claim 8, further comprising:

generating a locator map for locating said at least one selected travel article for packing of said plurality of travel articles;

wherein said locator map identifies location of said at least one selected travel article on the locator map relative to the article tracking device.

11. The method of claim 8, further comprising:

communicating an alert signal when a travel article that is disposed with said unique locator tag, but is not selected, is packed in said travel container.

12. The method of claim 8, wherein said unique locator tag includes at least one geographic or cultural data associated with a particular travel article.

13. The method of claim 8, wherein said unique locator tag utilizes chipless RFID technology.

14. The method of claim 8, wherein said packing wizard automatically generates a suggested packing list that is based on a user's inputted travel information;

wherein said travel information associates travel with a particular travel article;

wherein said travel information includes one or more of geographic data, cultural data and other travel-related information.

* * * * *